(12) United States Patent
Nakagawa et al.

(10) Patent No.: US 11,756,311 B2
(45) Date of Patent: Sep. 12, 2023

(54) PARKING SPOT AND PERSON DETECTION

(71) Applicant: Toyota Motor Engineering & Manufacturing North America, Inc., Plano, TX (US)

(72) Inventors: Masashi Nakagawa, Sunnyvale, CA (US); Divya Sai Toopran, Sunnyvale, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 142 days.

(21) Appl. No.: 17/324,068

(22) Filed: May 18, 2021

(65) Prior Publication Data

US 2022/0374639 A1 Nov. 24, 2022

(51) Int. Cl.
| | |
|---|---|
| *B60W 30/18* | (2012.01) |
| *B60W 30/06* | (2006.01) |
| *G06V 20/58* | (2022.01) |
| *G06T 7/60* | (2017.01) |
| *G08G 1/14* | (2006.01) |
| *G05D 1/02* | (2020.01) |
| *H04N 7/18* | (2006.01) |
| *G06V 40/10* | (2022.01) |
| *G06F 18/22* | (2023.01) |

(52) U.S. Cl.
CPC ......... *G06V 20/586* (2022.01); *G05D 1/0231* (2013.01); *G06F 18/22* (2023.01); *G06T 7/60* (2013.01); *G06V 40/10* (2022.01); *G08G 1/141* (2013.01); *H04N 7/188* (2013.01); *G06T 2207/30264* (2013.01)

(58) Field of Classification Search
CPC .... G06V 20/586; G06V 40/10; G05D 1/0231; G06K 9/6201; G06T 7/60; G06T 2207/30264; G08G 1/141; H04N 7/188
See application file for complete search history.

(56) References Cited

U.S. PATENT DOCUMENTS

| | | | | |
|---|---|---|---|---|
| 8,665,118 | B1 * | 3/2014 | Woodard | G08G 1/144 |
| | | | | 705/13 |
| 10,713,509 | B1 * | 7/2020 | Lei | G06V 20/586 |
| 2012/0265434 | A1 * | 10/2012 | Woodard | G08G 1/147 |
| | | | | 701/423 |
| 2017/0169708 | A1 * | 6/2017 | Brown | G08G 1/144 |
| 2017/0282913 | A1 * | 10/2017 | Qian | B60W 30/143 |
| 2018/0197048 | A1 * | 7/2018 | Micks | H04N 13/275 |
| 2018/0339708 | A1 * | 11/2018 | Geller | B60L 3/0015 |
| 2019/0057605 | A1 * | 2/2019 | Brown | A61K 45/06 |
| 2019/0101925 | A1 * | 4/2019 | Simmons | G05D 1/0225 |

(Continued)

*Primary Examiner* — Howard D Brown, Jr.
(74) *Attorney, Agent, or Firm* — SNELL & WILMER LLP (57) ABSTRACT

Methods, systems, and apparatus for a detection system for a vehicle. The detection system includes at least one of a camera or a sensor. The camera is configured to capture image data of a surrounding environment. The sensor is configured to detect sensor data. The detection system includes an electronic control unit. The electronic control unit is coupled to the camera and is configured to determine that there is an available parking spot or a person is positioned on a side of a road based on the image data or the sensor data. The electronic control unit is configured to provide a location of the available parking spot or the person to another device or to the vehicle.

20 Claims, 5 Drawing Sheets

(56) References Cited

U.S. PATENT DOCUMENTS

| | | | |
|---|---|---|---|
| 2019/0294889 A1* | 9/2019 | Sriram | G06F 18/24143 |
| 2020/0211389 A1* | 7/2020 | Hao | G01C 21/30 |
| 2020/0257317 A1* | 8/2020 | Musk | G05D 1/0044 |
| 2021/0295704 A1* | 9/2021 | Sutorius | B60R 11/04 |
| 2022/0009493 A1* | 1/2022 | Mizoguchi | B60W 30/0953 |
| 2022/0161783 A1* | 5/2022 | Golgiri | G06V 20/586 |
| 2022/0371578 A1* | 11/2022 | Lee | B60W 40/08 |

* cited by examiner

PARKING SPOT AND PERSON DETECTION

BACKGROUND

Field

This disclosure relates to detecting and sharing the location of available parking spots and/or the location of persons-of-interest while driving a vehicle.

Description of the Related Art

In general, the need for parking has grown considerably and there are various technologies to monitor on-street parking and also within multi-level car parks or parking garages. The monitoring of availability of on-street parking and also within multi-level car parks or garages improves the efficiency of the usage of the on-street parking and/or the multi-level car parks or garages. The various technologies, however, require sensors to be installed at each of the potential parking spaces. Moreover, the sensors that monitor the individual parking spaces may be fixed and may not be able to identify parking spaces that are formed extemporaneously, such as between two vehicles or a vehicle and another object and/or between two objects. Additionally, these systems require hardware that is to be installed in each of the individual parking spaces to monitor the availability of the parking space. These systems may not account for user preferences and/or provide additional information regarding the parking space that may be important in determining whether the parking space will fit a vehicle. Moreover, these systems may not identify and locate persons-of-interest.

Accordingly, there is a need for a system and method for identifying and determining available parking spots and/or persons-of-interest while the vehicle is traveling on a roadway.

SUMMARY

In general, one aspect of the subject matter described in this disclosure may be embodied in a detection system for a vehicle. The detection system includes at least one of a camera or a sensor. The camera is configured to capture image data of a surrounding environment. The sensor is configured to detect sensor data. The detection system includes an electronic control unit. The electronic control unit is coupled to the camera and is configured to determine that there is an available parking spot or a person is positioned on a side of a road based on the image data or the sensor data. The electronic control unit is configured to provide a location of the available parking spot or the person to another device.

These and other embodiments may optionally include one or more of the following features. The detection system may include a navigation unit. The navigation unit may be configured to determine a current location of the vehicle. The electronic control unit may be configured to determine the location of the available parking sport or the person based on the current location of the vehicle.

The detection system may include at least one of a navigation unit that is configured to determine or obtain a current location of the vehicle or a vehicle speed sensor that is configured to measure or determine a speed of the vehicle. The electronic control unit may be coupled to the at least one of the navigation unit or the vehicle speed sensor. The electronic control unit may be configured to activate at least one of the camera or the sensor based on the speed of the vehicle or a current location of the vehicle.

The electronic control unit may be configured to detect whether there is an available parking spot when the speed of the vehicle is less than a first threshold amount. The electronic control unit may be configured to determine a size of the available parking spot when the speed of the vehicle is less than a second threshold amount and the available parking spot is detected. The electronic control unit may be configured to identify one or more objects surrounding the available parking spot when the speed of the vehicle is less than the second threshold amount. The second threshold amount may be less than the first threshold amount. The electronic control unit may be configured to provide the location of the available parking spot to the other device to be displayed on a map.

The electronic control unit may be configured to obtain an image of a person. The electronic control unit may be configured to recognize one or more objects within the image data. The electronic control unit may be configured to compare the image of the person to the one or more objects and may determine that an object of the one or more objects matches the image of the person based on the comparison. The electronic control unit may be configured to provide the location of the person.

In another aspect, the subject matter may be embodied in a system for a vehicle. The system includes a camera configured to capture image data or a sensor configured to detect sensor data. The system includes a vehicle speed sensor configured to determine a speed of the vehicle. The system includes an electronic control unit (e.g., a processor or a specifically programmed processor). The electronic control unit is coupled to the camera or the sensor and the vehicle speed sensor. The electronic control unit is configured to activate a spot detection mode when the speed of the vehicle is less than a first threshold amount or when resource usage of the sensor is less than a first threshold amount. The electronic control unit may be configured to determine that there is an available parking spot or a person is positioned on a side of a road based on the image data or the sensor data when the vehicle is in the spot detection mode. The electronic control unit may be configured to provide a location of the available parking spot or the person.

In another aspect, the subject matter may be embodied in a method for identifying an available parking spot. The method includes capturing, by a camera, image data. The method includes determining, by a processor and using a speed sensor, a speed of a vehicle. The method includes setting, by the processor, the vehicle into a spot detection mode when the speed of the vehicle is less than a first threshold amount. The method includes determining, by the processor, that there is an available parking spot or a person is positioned on a side of a road based on the image data when the vehicle is in the spot detection mode. The method includes providing, by the processor, a location of the available parking spot or the person to another device.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for detecting an available parking spot and/or person-of-interest that is waiting by the side of the road or on a sidewalk. Particular embodiments of the subject matter described in this disclosure may be implemented to realize one or more of the following advantages. The parking spot or person detection system (or "detection system") detects or identifies an available parking spot or a person on a side of the road or on a sidewalk. The detection system may switch between a parking spot detection mode that detects or identifies the available parking spot or a person detection mode that detect or identifies a person on the side of the road or on a sidewalk and a safety detection mode that operates the safety features of the vehicle, such as a blind spot detector, a lane detector or other safety features of the vehicle. By managing the use of the parking spot detection mode (or the person detection mode) and/or the safety detection mode, the detection system more efficiently uses computing resources and minimizes energy usage while the vehicle is traveling.

The detection system provides other benefits and advantages. The detection system may provide the capability to analyze image data to identify whether a parking spot is available, and if the parking spot is available and the vehicle slows down to park in the parking spot, the detection system may analyze the size of the parking spot including its length, width and/or height of the parking spot to determine whether the vehicle may fit into the parking spot. Moreover, the detection system may relay or provide the availability of the parking spot to another device, e.g., to be displayed on a map. This allows the detection system to share the location, the availability and/or other additional information of the parking spot to other users who may be looking for a parking spot.

Additionally, the detection system may identify one or more persons on the side of the street and may match the one or more persons to a person of interest. Thus, the detection system may identify the location of the person of interest and provide the location of the person of interest to a user either within the vehicle or another user in another vehicle. For example, when the vehicle is traveling along the curb of an airport, the detection system may identify that the person of interest is waiting on the side of the curb of the airport awaiting pickup and provide that information to the driver or another user in another vehicle.

Furthermore, the detection system may be utilized with an autonomous or semi-autonomous vehicle and work in conjunction with other sensors to assist with navigation of the vehicle. For example, the detection system may be utilized by the autonomous or semi-autonomous vehicle to automatically identify and park the vehicle and/or to automatically slow down, stop and park to pick up a person-of-interest.

Figure 1:
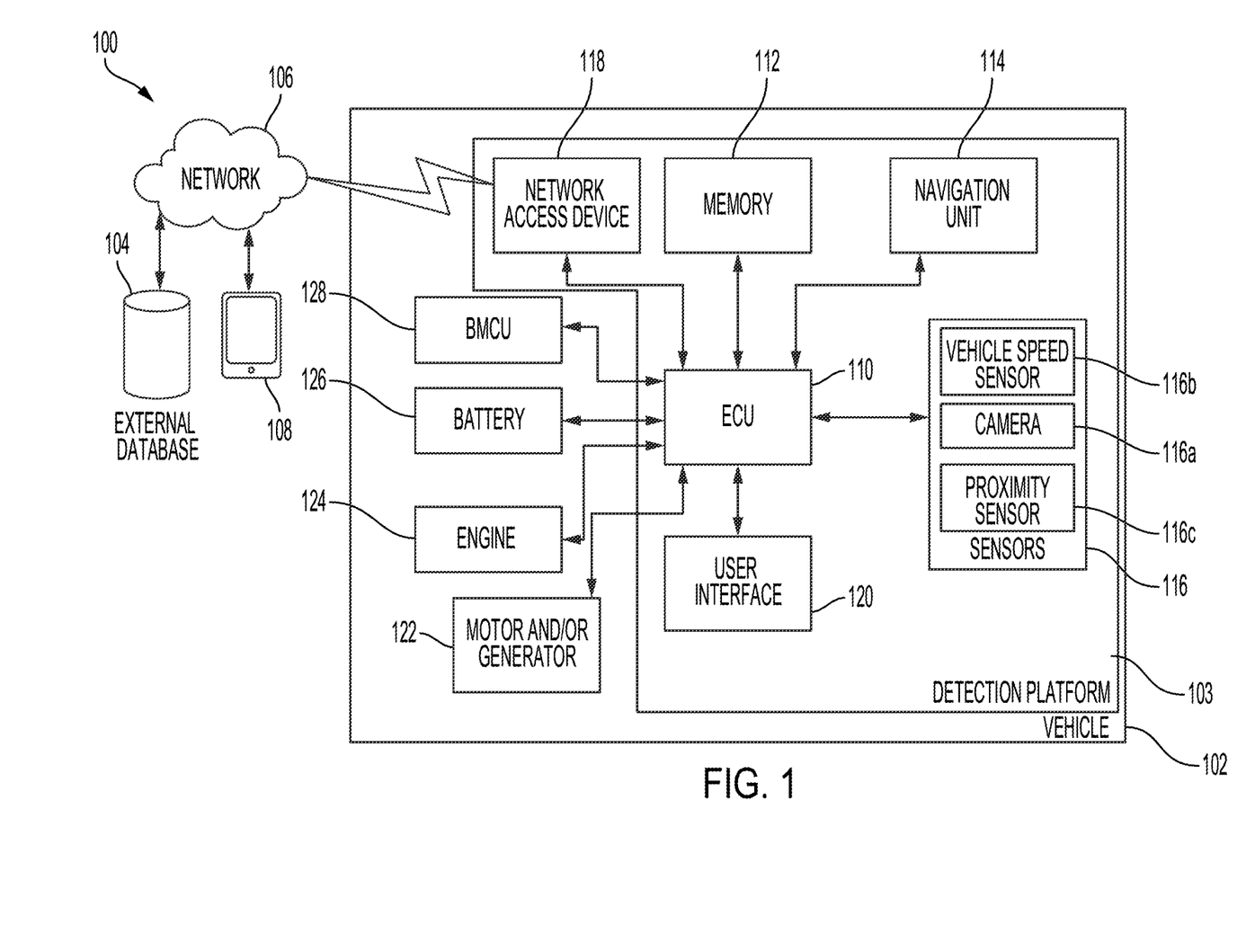
FIG. 1 is a block diagram of an example detection system according to an aspect of the invention.

FIG. 1 is a block diagram of a detection system 100. The detection system 100 may be retro-fitted, coupled to, include, or be included within a vehicle 102. The detection system 100 may couple, connect to, or include an external database 104 and/or one or more other devices 108, such as a user device. The detection system 100 may have a network 106 that links the external database 104 with the vehicle 102 and/or the one or more other devices 108. The network 106 may be a local area network (LAN), a wide area network (WAN), a cellular network, the Internet, or combination thereof, that connects, couples and/or otherwise communicates between the vehicle 102 and the external database 104. The one or more other devices 108 may be a user device, such as a personal laptop, a smartphone, a wearable device, or other personal device.

The detection system 100 obtains, detects, or otherwise determines the speed or location of the vehicle 102 and changes operation of the vehicle 102 based on the speed and/or the location of the vehicle 102. The detection system 100 may operate the vehicle 102 in a spot detection mode (or person detection mode) and/or a safety detection mode. In the spot detection mode and/or the person detection mode, the detection system 100 may detect and/or determine an available parking spot on the side of the road and/or may detect or determine persons on the side of the road. The detection system 100 may provide the location of the available parking spots and/or the location of the persons to other users via updating the external database 104 and/or directly sending the information to one or more other devices 108. In the safety detection mode, the detection system 100 continues to monitor one or more safety features, such as a blind spot detector and/or a lane change detector. By controlling the operation of the vehicle 102 between the spot detection mode and/or the safety detection mode, the detection system 100 more efficiently utilizes the computing and energy resources of the vehicle 102.

In various embodiments, the detection system 100 can operate in all modes at the same time or in a sequential manner. For example, the detection system 100 can operate in the spot detection mode, the person detection mode, and the safety detection mode by quickly and efficiently rotating use of the sensors for use by each mode. As an example, each mode can use all the sensors for 100 ms and rotate through all 3 modes. Also, some sensors can be designated for each mode such that all 3 modes have a designated set of sensors for the particular application, which are advantageously located for each particular mode. In addition, in the spot detection mode, the detection system 100 can also detect persons such that the person detection mode is not needed.

The detection system 100 may include or be retro-fitted or otherwise coupled with the vehicle 102. A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input.

An autonomous vehicle may have and use one or more sensors and/or a navigation unit to drive autonomously.

The detection system 100 includes a detection platform 103. The detection platform 103 includes one or more processors, such as an electronic control unit (ECU) 110 and a memory 112. The detection platform 103 may include other components, such as a navigation unit 114, a network access device 118, a user interface 120, one or more sensors 116 including one or more cameras 116a, a vehicle speed sensor 116b and/or other sensors, such as a proximity sensor 116c. The detection platform 103 may couple, connect to, and/or include one or more vehicle components such as the motor and/or generator 122, the engine 124, the battery 126, and/or the battery management control unit (BMCU) 128.

The ECU 110 may be implemented as a single ECU or as multiple ECUs. The ECU 110 may be electrically coupled to some or all of the other components within the vehicle 102, such as the motor and/or generator 122, the engine 124, the battery 126, the battery management control unit (BMCU) 128, the memory 112, the network access device 118 and/or one or more sensors 116. The ECU 110 may include one or more processors or controllers specifically designed for identifying available parking spots and/or individuals or other persons positioned on a curb near a roadway or a sidewalk.

The ECU 110 may use one or more sensors 116 to determine the speed of the vehicle 102 and operate the vehicle 102 in a spot detection mode (and/or a person detection mode) and/or a safety detection mode. When in the spot detection mode, the ECU 110 may determine the availability of a parking spot and provide the location of the parking spot to other users when the parking spot is available. Moreover, in the person detection mode, the ECU 110 may use the one or more sensors 116 to identify a person waiting by the roadway and provide the location of the person to other users. The ECU 110 may cycle between different modes and/or may cycle between the fidelity of analysis of the spot detection mode (or the person detection mode) and/or the safety detection mode to conserve computing resources and energy to increase the energy efficiency of the vehicle 102.

The memory 112 may be coupled to the ECU 110 and store instructions that the ECU 110 executes. The memory 112 may include one or more of a Random Access Memory (RAM) or other volatile or non-volatile memory. The memory 112 may be a non-transitory memory or a data storage device, such as a hard disk drive, a solid-state disk drive, a hybrid disk drive, or other appropriate data storage, and may further store machine-readable instructions, which may be loaded and executed by the ECU 110. Moreover, the memory 112 may be used to record and store image data that may be analyzed to determine whether there is an available parking spot and/or a person-of-interest that is to be identified.

Figure 4:
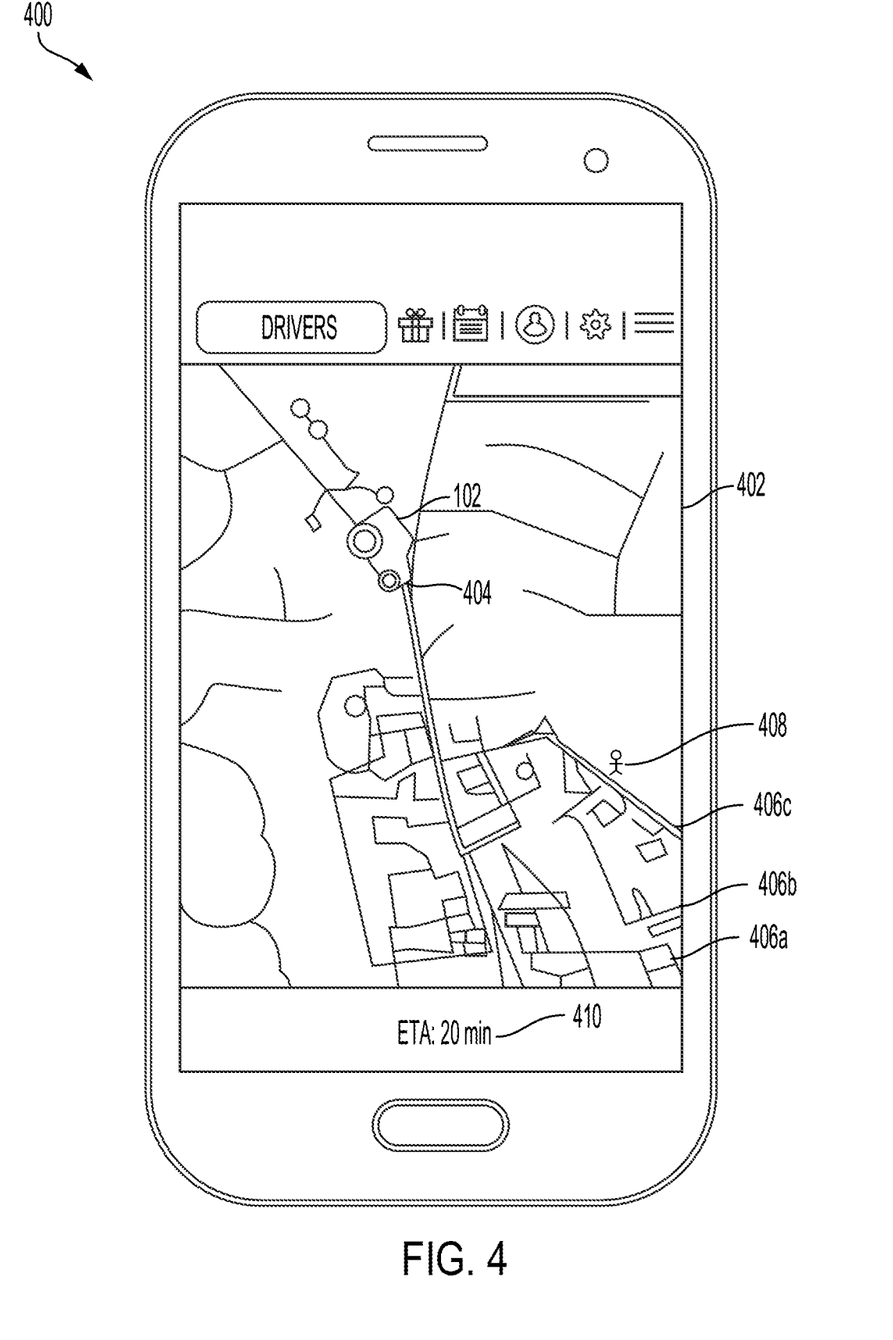
FIG. 4 shows an example illustration of a graphical user interface of a user device that displays the locations of the available spots or persons-of-interest using the detection system of FIG. 1 according to an aspect of the invention.

The detection platform 103 may include a user interface 120. The detection platform 103 may display one or more notifications on the user interface 120. The one or more notifications on the user interface 120 may notify occupants of the vehicle 102 when the detection system 100 detects an available parking spot and/or identifies that a person is near the curb of the roadway or on a sidewalk. The detection platform 103 may display a map that provides an indication of the location of one or more available parking spots and/or the location of the identified person, as shown in FIG. 4, for example. The user interface 120 may include an input/output device that receives user input from a user interface element, a button, a dial, a microphone, a keyboard, or a touch screen.

The user interface 120 may receive user input that may zoom in or zoom out of a map that shows the location of the one or more available parking spots and/or the location of the identified person. The user interface 120 may receive user input that indicates one or more user preferences. The one or more user preferences may indicate the size of the vehicle 102 and/or the desired size of the available parking spot so that the map may only show locations of available parking spots that meet the size requirements. Moreover, the user input may include image data of facial features of the person to search and identify.

The detection platform 103 may include a network access device 118. The network access device 118 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access device 118 may transmit data to and receive data from the external database 104. For example, the ECU 110 may communicate with the external database 104 to obtain a map of locations of various different parking spots and their availabilities and/or locations of different people that are identified as a person-of-interest to be displayed on the user interface 120.

The detection platform 103 may include a navigation unit 114 and/or one or more sensors 116. The navigation unit 114 may be integral to the vehicle 102 or a separate unit coupled to the vehicle 102, such as a personal device with navigation capabilities. When the navigation unit 114 is separate from the vehicle 102, the navigation unit 114 may communicate with the vehicle 102 via the network access device 118. The vehicle 102 may include a Global Positioning System (GPS) unit (not shown) for detecting location data including a current location of the vehicle 102 and/or date/time information. In that regard, the ECU 110 may perform the functions of the navigation unit 114 based on data received from the GPS unit. At least one of the navigation unit 114 or the ECU 110 may predict or propose a route set that includes a starting location and a destination location. The navigation unit 114 or the ECU 110 may perform navigation functions. Navigation functions may include, for example, route and route set predictions, providing navigation instructions, and receiving user input such as verification of predicted routes and route sets or destinations. Other information, such as a current speed of the vehicle 102, may be extrapolated, interpreted, or otherwise calculated from the data obtained from the navigation unit 114.

The navigation unit 114 may provide and obtain navigational map information including location data, which may include a current location, a starting location, a destination location and/or a route between the starting location or current location and the destination location of the vehicle 102. The navigation unit 114 may include a memory (not shown) for storing the route data. The navigation unit 114 may receive data from other sensors capable of detecting data corresponding to location information. For example, the other sensors may include a gyroscope or an accelerometer.

The one or more sensors 116 may include one or more cameras 116a, a vehicle speed sensor 116b and/or other sensors, such as a proximity sensor 116c. The one or more cameras 116a may include multiple cameras positioned either on the outside of the vehicle 102 and/or within the vehicle 102 but directed outward to capture different views of the surrounding environment outside the vehicle 102. The one or more cameras 116a may be positioned along a frame of the vehicle 102, such as along the roof, the trunk, or the front of the vehicle 102. The one or more cameras 116a may capture a two-dimensional (2-D) image and/or a three-dimensional (3-D) image of the surrounding environment. In some implementations, the different views of the surrounding environment are used to form a composite image that may be either 2-D or 3-D. The different views of the surrounding environment may be used to determine the one or more objects in the surrounding environment and identify one or more available parking spots and/or persons in the surrounding environment.

The one or more sensors 116 may include a vehicle speed sensor 116*b*. The vehicle speed sensor 116*b* may measure the amount of rotation of the multiple wheels to determine whether the vehicle 102 is in motion and the speed of the vehicle 102. The one or more sensors 116 may include other sensors, such as a proximity sensor 116*c*, to measure a distance or detect objects within a threshold distance of the vehicle 102. The one or more other sensors may include a sound sensor to detect sound, a LIDAR sensor to detect light or a radar to detect radio waves, which may be used to determine or recognize objects in the surrounding environment and/or measure ranges or locations of the objects in the surrounding environment.

The detection system 100 may couple, connect to, and/or include one or more vehicle components. The one or more vehicle components may include a motor and/or generator 122. The motor and/or generator 122 may convert electrical energy into mechanical power, such as torque, and may convert mechanical power into electrical energy. The motor and/or generator 122 may be coupled to the battery 126. The motor and/or generator 122 may convert the energy from the battery 126 into mechanical power, and may provide energy back to the battery 126, for example, via regenerative braking. The vehicle 102 may include one or more additional power generation devices such as the engine 124 or a fuel cell stack (not shown). The engine 124 combusts fuel to provide power instead of and/or in addition to the power supplied by the motor and/or generator 122.

The battery 126 may be coupled to the motor and/or generator 122 and may provide electrical energy to and receive electrical energy from the motor and/or generator 122. The battery 136 may include one or more rechargeable batteries.

The BMCU 128 may be coupled to the battery 126 and may control and manage the charging and discharging of the battery 126. The BMCU 128, for example, may measure, using battery sensors, parameters used to determine the state of charge (SOC) of the battery 126. The BMCU 128 may control the battery 126.

The detection platform 103 may include or be coupled to the external database 104. A database is any collection of pieces of information that is organized for search and retrieval, such as by a computer, and the database may be organized in tables, schemas, queries, reports, or any other data structures. A database may use any number of database management systems. The external database 104 may include a third-party server or website that stores or provides information. The information may include real-time information, periodically updated information, or user-inputted information. A server may be a computer in a network that is used to provide services, such as accessing files or sharing peripherals, to other computers in the network.

The external database 104 may be a relational database that stores a map of different locations of one or more parking spots or areas of potential parking spots. The external database 104 may be updated and/or provide updates in real-time. The external database 104 may store and/or provide the map to various other devices 108. The ECU 110 may also update and/or provide information to the external database 104 to inform other drivers of the locations of available parking spots and/or locations of one or more persons.

Figure 2:
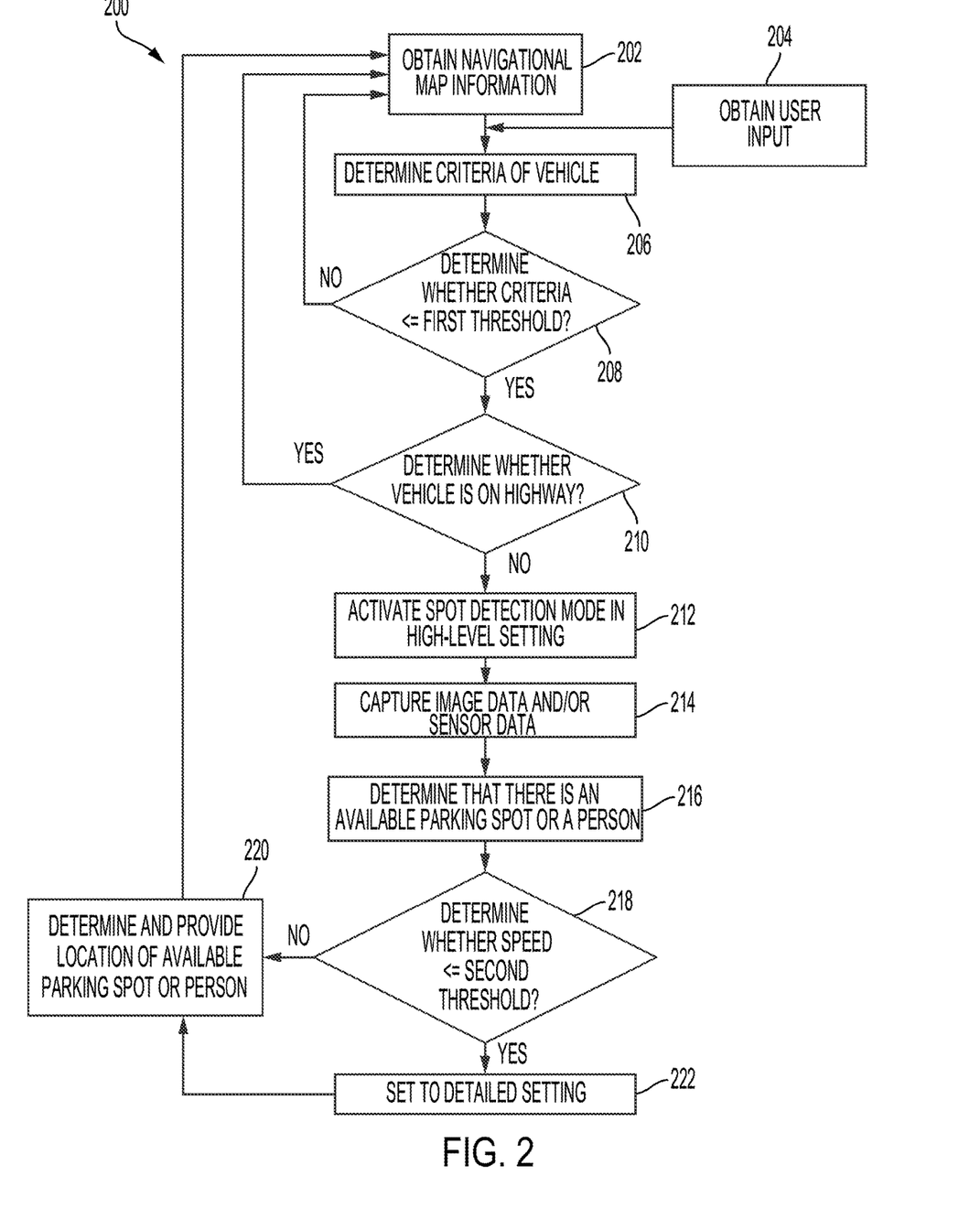
FIG. 2 is a flow diagram of an example process for locating an available parking spot and/or person using the detection system of FIG. 1 according to an aspect of the invention.

FIG. 2 is a flow diagram of a process 200 for locating an available parking spot and/or person. One or more computers or one or more data processing apparatuses, for example, the ECU 110 of the detection platform 103 of the detection system 100 of FIG. 1, appropriately programmed, may implement the process 200. The detection platform 103 may operate in one or more modes at any one time. The one or more modes may include a spot detection mode that detects or determines an availability of a parking spot and/or identifies one or more persons-of-interest. The one or more modes may include a safety detection mode that operates the other safety features when the vehicle 102 is in motion, such as the lane detectors or the blind spot detectors. Operation of the one or more modes requires computing and energy resources, and thus, the detection platform 103 may switch between or sequentially cycle through modes to reduce the energy and/or computing resource usage.

The detection platform 103 may obtain navigational map information (202). The detection platform 103 may use the navigation unit 114 to obtain the navigational map information. The navigational map information may include a current location of the vehicle 102, a current time of day, and other map information. The other map information may include no-park or waiting zones, places of interest in proximity or within a threshold distance of the vehicle 102, location of objects that may be fixated at or near the current location, landmarks in proximity or within a threshold distance of the vehicle 102 and/or locations of one or more previously identified available parking spots and/or locations of one or more identified persons of interest. The detection platform 103 may obtain the navigational map information from one or more external databases 104 via the network 106.

The detection platform 103 may extract the current location and/or the other map information from the navigational map information. For example, the detection platform 103 may use a GPS system to determine the current location of the vehicle 102 and may provide the current location of the vehicle 102 to an external database 104 to obtain nearby map information to identify different places of interest in proximity to the vehicle 102. Some places of interest may include a liquor store, a restaurant, a fast-food restaurant or other place of interest that may have available parking and/or may be a place frequented by an identified person. In another example, the detection platform 103 may extract or determine the location of a person-of-interest and/or locations of one or more available parking spots identified by another vehicle or other detection platform 103 on another device and/or otherwise identified. The detection platform 103 may use the current location of the vehicle 102 and the current time of day over multiple samples to calculate or determine the speed of the vehicle 102.

The detection platform 103 may obtain user input (204). The detection platform 103 may obtain the user input through the user interface 120. The user input may include one or more user preferences and/or an image or an identity of a person-of-interest. For example, the one or more user preferences may be entered via the user interface 120, such as in fields, and may include a height, a length and/or a width of the vehicle 102 along with a desired offset or safety distance between the front and/or back of the vehicle 102 with another object. The one or more user preferences may include information about objects to avoid near or in proximity to a parking spot, such as a no-park or waiting zone, a driveway, a parking sign, a fire hydrant, a tree or other object that may impede or obstruct the parking of the vehicle 102. The one or more user preferences may include information about objects that are desired near or in proximity to a parking spot, such as a place of interest or a business entity. The one or more user preferences may be used to determine whether the available parking spot is desirable for the driver of the vehicle 102.

The user input may include an identity of a person-of-interest that the driver or other occupant of the vehicle 102 would like to locate, such as an image of the person-of-interest or an image of a portion of the person-of-interest, such as the face of the person. The detection platform 103 may couple to another device 108, such as a user device, and obtain the image of the person-of-interest or the image of the portion of the person-of-interest to store in the memory 112 for later identification. The user input may also include one or more thresholds to operate the safety detection mode and/or the spot detection mode, such as the thresholds for the vehicle speed to operate the high-level setting or the detailed setting. In some implementations, the one or more thresholds may be pre-configured, user-configured and/or otherwise predetermined.

The detection platform 103 may obtain, detect, or otherwise determine criteria of the vehicle 102 (206). The criteria may include the speed of the vehicle 102 and/or the amount of resource usage of the one or more sensors 116 and/or the ECU 110. The detection platform 103 may use one or more sensors 116, such as the vehicle speed sensor 116*b*, to detect or determine the speed of the vehicle 102. The vehicle speed sensor 116*b* may measure the number of rotations of one or more wheels of the vehicle 102 to determine the speed of the vehicle 102. In some implementations, the detection platform 103 may extract the current location of the vehicle 102 at two different times from the navigational map information and calculate the speed of the vehicle 102 based on the distance traveled and the elapsed time in between to calculate or determine the speed of the vehicle 102.

Once the criteria of the vehicle 102 is determined, the detection platform 103 may determine whether the criteria of the vehicle 102 is less than or equal to a first threshold (208). For example, the detection platform 103 may compare the speed of the vehicle 102 to a first threshold speed to identify when the vehicle 102 is traveling slow enough to indicate that the driver of the vehicle 102 may be searching for a parking spot and/or a person on the side of the road. The first threshold speed may be approximately between 10-20 mph (or 20 mph or less), which may indicate that the driver of the vehicle 102 is slowing down to locate a parking spot and/or person.

In another example, the detection platform 103 may compare the resource usage of the one or more sensors 116 and/or the ECU 110 to a first threshold amount. The first threshold amount may be approximately 40%-50% of the processing power. When the processing power is not being completely used, the detection platform 103 may use the additional resources to perform spot detection.

If the detection platform 103 determines that the speed of the vehicle 102 is greater than the first threshold, the detection platform 103 may determine that the driver has no intention of parking, and/or if the resource usage is greater than the first threshold amount, there may not be sufficient resources to perform spot detection. And so, the detection platform 103 may continue to monitor the criteria including the speed, resource usage and/or location of the vehicle 102 (202). If the detection platform 103 determines that the speed of the vehicle 102 is less than or equal to the first threshold and/or the resource usage is less than or equal to the first threshold amount, this may indicate the driver is searching for a parking spot and/or there is sufficient resources to perform spot detection alone or in combination with the safety detection mode, and so, the detection platform 103 may determine whether the vehicle 102 is on the highway or other roadway where parking is unlikely (210).

The detection platform 103 may determine whether the vehicle 102 is on a highway or other roadway where parking is unlikely (210). The detection platform 103 may extract the current location of the vehicle 102 from the navigational map information and compare the current location of the vehicle 102 to the map information, which may indicate the various locations and types of roadways, such as the type of road that the vehicle 102 is traversing. If the current location of the vehicle 102 is on the highway, the detection platform 103 may determine that the driver has no intention to park the vehicle 102 and that the slowing of the vehicle 102 may be the result of traffic or other reasons, and so, the detection platform 103 may continue to monitor the speed, location and other criteria of the vehicle 102 (202). If the current location of the vehicle 102 is not on the highway, the detection platform 103 may determine that the driver intends to park the vehicle 102, and so, may activate a spot detection mode (212). For example, when the current location of the vehicle 102 indicates that the vehicle 102 is in a residential area or other non-highway road, the driver is able to slow down and park on the side of the roadway, whereas, on a highway, the side of the highway is not intended for a driver to park.

The detection platform 103 may activate a spot detection mode (212). The detection platform 103 may switch the vehicle 102 from operating in the safety detection mode and activate the spot detection mode (and/or person detection mode) or may operate the spot detection mode in combination with the safety detection mode, in which case, the detection platform 103 may reduce the resources used by the safety detection mode to simultaneously operate the spot detection mode. When operating the safety detection mode and the spot detection mode (and/or the person detection mode), the detection platform 103 may reduce the frequency of sampling that the one or more safety devices, such as a lane change detector or a blind side detector, performs to reduce the usage of energy and/or computing resources to allow the spot detection mode to operate more efficiently.

In the spot detection mode, the detection platform 103 activates one or more cameras 116*a* and/or one or more other sensors, such as a proximity sensor 116*c*. The one or more cameras 116*a* may capture image data of the environment surrounding the vehicle 102. The proximity sensor 116*c* may obtain sensor data of the environment surrounding the vehicle 102 including the presence or lack of presence of objects in the surrounding environment. The detection platform 103 may use the image data and/or the sensor data to determine the presence or lack of presence of a parking spot and its availability and/or the presence or lack of presence of a person and whether the person is a person-of-interest.

Figure 3:
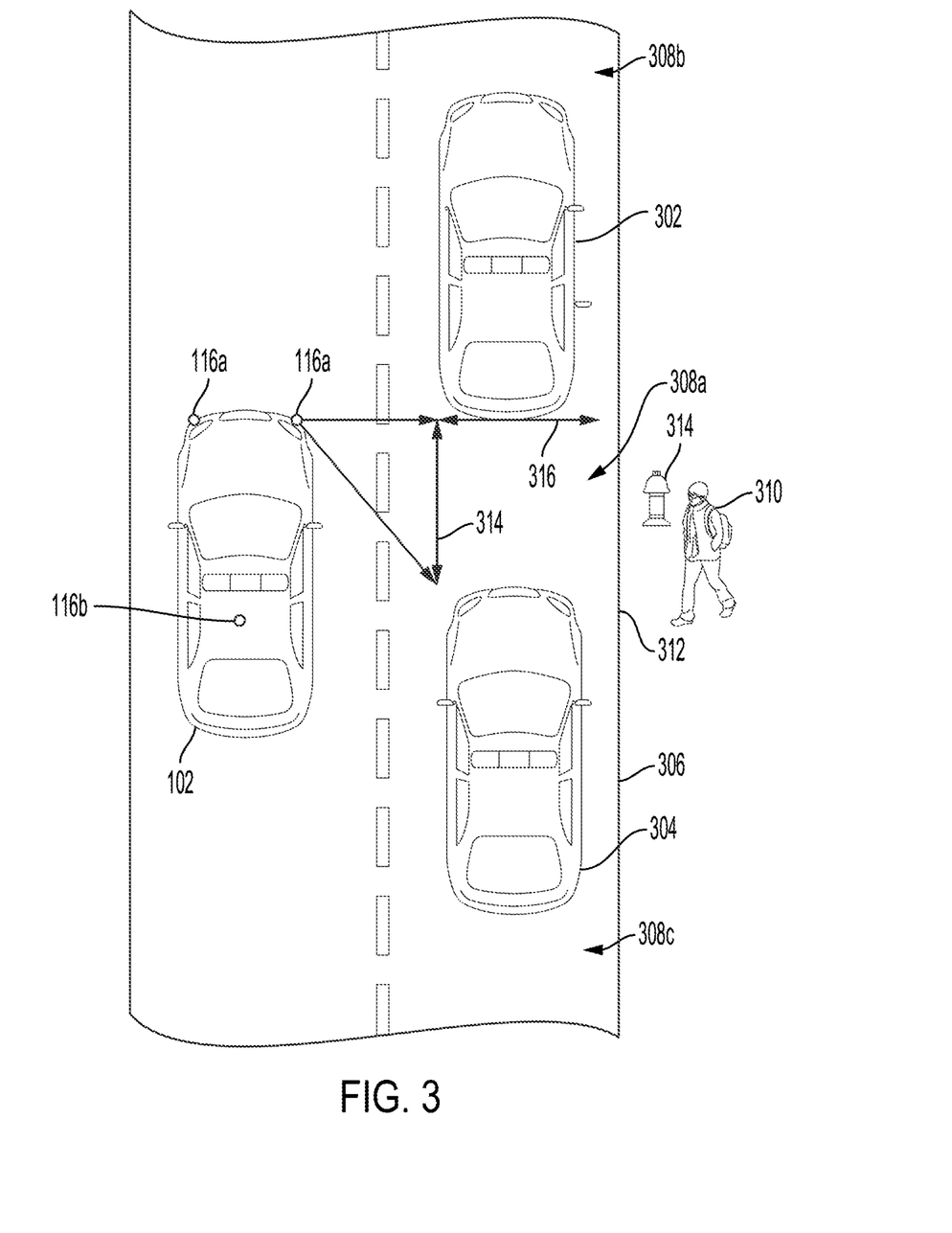
FIG. 3 shows an example illustration of the detection system of FIG. 1 identifying or determining that there is an available spot or persons-of-interest according to an aspect of the invention.

The spot detection mode may have multiple settings. The multiple settings may include a high-level setting and a detailed setting. In the high-level setting, the detection platform 103 may identify whether there is an open space 308 between two or more objects, such as between two more vehicles 302, 304 along the side of a roadway 306, such as along a curb 312 of the roadway 306 or on a sidewalk, or an open space 308*b-c* before or after a vehicle 302 or the vehicle 304 along the side of the roadway 306, as shown in FIG. 3 for example. In some implementations, in the high-level setting, the detection platform 103 may identify whether there are one or more persons 310 along the side of the roadway 306. The high-level setting may not go into more detail than identifying the presence or lack of presence of the one or more open spaces 308a-c and/or the one or more persons 310. The detection platform 103 may default to the high-level setting when the spot detection mode is activated. This is to conserve computing resources and energy to increase energy efficiency of the vehicle 102.

The detailed setting of the spot detection mode and the person detection mode analyzes an available spot or person in more detail. For example, in the detailed setting, the detection platform 103 determines whether a person is the person-of-interest and/or whether the vehicle 102 would fit in the available spot. The detailed setting, however, may consume more computing resources and energy than the high-level setting.

Once the spot detection mode (and/or the person detection mode) is activated, the detection platform 103 may capture image data and/or sensor data of the surrounding environment of the vehicle 102 (214). The detection platform 103 may use the one or more cameras 116a to capture the image data. The image data may include multiple objects in the surrounding environment, such as vehicles 302, 304, the curb 312, the one or more persons 310 and other objects in the surrounding environment. The detection platform 103 may use the one or more proximity sensors 116c to capture sensor data. The sensor data may indicate or identify multiple objects in the surrounding environment along with areas in between the multiple objects that are open or are otherwise devoid or empty of objects. In some implementations, the detection platform 103 may use one or more other sensors to detect the sensor data, such as the reflection of sound waves, radar, light or other sensor data that provides real world information to recognize and/or detect objects in the surrounding environment.

Once the image data and/or sensor data is captured, the detection platform 103 determines that there is an available spot or there are one or more persons in proximity to the vehicle 102 (216). The detection platform 103 may determine that there is an available spot or there are one or more persons in proximity to the vehicle 102 along the roadway based on the image data and/or sensor data. The detection platform 103 may recognize one or more objects within the image data by defining outlines of objects within the image data. The detection platform 103 may identify open spaces and/or areas between two or more objects and/or identify that one or more of the objects match an outline of a person or human being, and may associate the open spaces 308a-c and/or areas with an available parking spot and/or the outline of the person or human being with a person 310 alongside the curb 312 of the roadway 306. The detection platform 103 may also use heat sensors, infrared detectors, and/or radar to detect the person or human. The detection platform 103 may determine that there are objects and/or may identify the relative distance between objects to identify areas that are empty or devoid of objects from the sensor data to determine the availability of a parking spot.

The detection platform 103 may determine whether the speed of the vehicle 102 is less than or equal to a second threshold (218). The detection platform 103 may compare the speed of the vehicle to a second threshold. The second threshold may be less than the first threshold and may indicate that the driver of the vehicle 102 intends to park in the available parking spot or is searching for an available parking spot. The second threshold may be approximately less than 5 mph, for example.

When the vehicle 102 continues to travel at a speed greater than the second threshold, the driver may not have identified an available parking spot that would accommodate the vehicle 102, and so, the detection platform 103 may provide the location of the available parking spot or the location of the one or more persons to one or more other devices 108 and/or the external database 104 (220). Then, the detection platform 103 may continue to monitor for available parking spots or for more persons.

When the driver slows to less than or equal to the second threshold, the driver may be evaluating whether the vehicle 102 is able to park in the available park spot and/or may be evaluating whether a person-of-interest is on the side of the roadway or on a sidewalk. And so, the detection platform 103 may set the spot detection mode (and/or the person detection mode) to the detailed setting (222). In the detailed setting, the detection platform 103 may analyze the image data and/or sensor data and calculate the relative distance between the two or more objects, such as between the vehicles 302, 304, that form the open space 308a and/or between an object, such as a vehicle 302, and another object, such as the fire hydrant or an open area, to determine the size or length 314 of an open space 308a-c. The detection platform 103 may also calculate or determine the height within the open space 308a-c, the width 316 of the open space 308a-c and/or other dimensions of the open space 308a-c by comparing the relative sizes of objects within the image data. Moreover, the detection platform 103 may determine whether the one or more persons in the image data is a person-of-interest and/or there are other objects of interest in the image data, as further described in FIG. 5.

The detection platform 103 determines and provides the location of the available parking spot and/or the location of the person (220). The detection platform 103 may associate the current location of the vehicle 102 where the image was captured with the location of the available parking spot and/or the location of the person. In some implementations, the detection platform 103 may determine the relative distance and/or the direction of the available parking spot or person relative to the current location of the vehicle 102 based on the image data and determine the location of the available parking spot and/or the location of the person based on the current location and the determined relative distance and/or direction to provide a more accurate location of the available parking spot or person. The detection platform 103 may continue to monitor for an available parking spot or persons-of-interest.

The detection platform 103 may provide the location of the available parking spot and/or the location of the person to one or more devices 108, the external database 104 and/or onto the user interface 120, such as on a display. The detection platform 103 may provide additional information including the size of the available parking spot and/or a matching indication that the one or more persons to a person-of-interest to along with the locations of the available parking spot and/or locations of the person. This allows the locations of the available parking spot and/or the location of the persons to be displayed and/or shared with other users via an application or browser, as shown in FIG. 4, for example.

FIG. 4 shows a graphical user interface 400 of a user device, such as a display of another device 108 or on the user interface 120. The graphical user interface 400 shows a map 402. The map 402 may show the current location 404 of the vehicle 102, one or more locations of one or more available parking spots 406a-c and/or a location of a person-of-interest 408 that has been identified as a match. The one or more locations of the one or more available parking spots 406a-c shown may include one or more available parking spots 406a-c that were merely identified or determined to be available and/or one or more available parking spots 406a-c that would match the size of the vehicle 102 that the user is driving and/or operating.

In some implementations, the graphical user interface 400 may also display additional information. The additional information may include an estimated time-to-arrival 410 to the nearest available parking spot and/or to the person-of-interest. The additional information may include other information, such as a description of objects that are in proximity to an available parking spot, a description of the size, such as the length, width and/or height of the available parking spot, and/or an identify a person in proximity to the roadway or the sidewalk.

Figure 5:
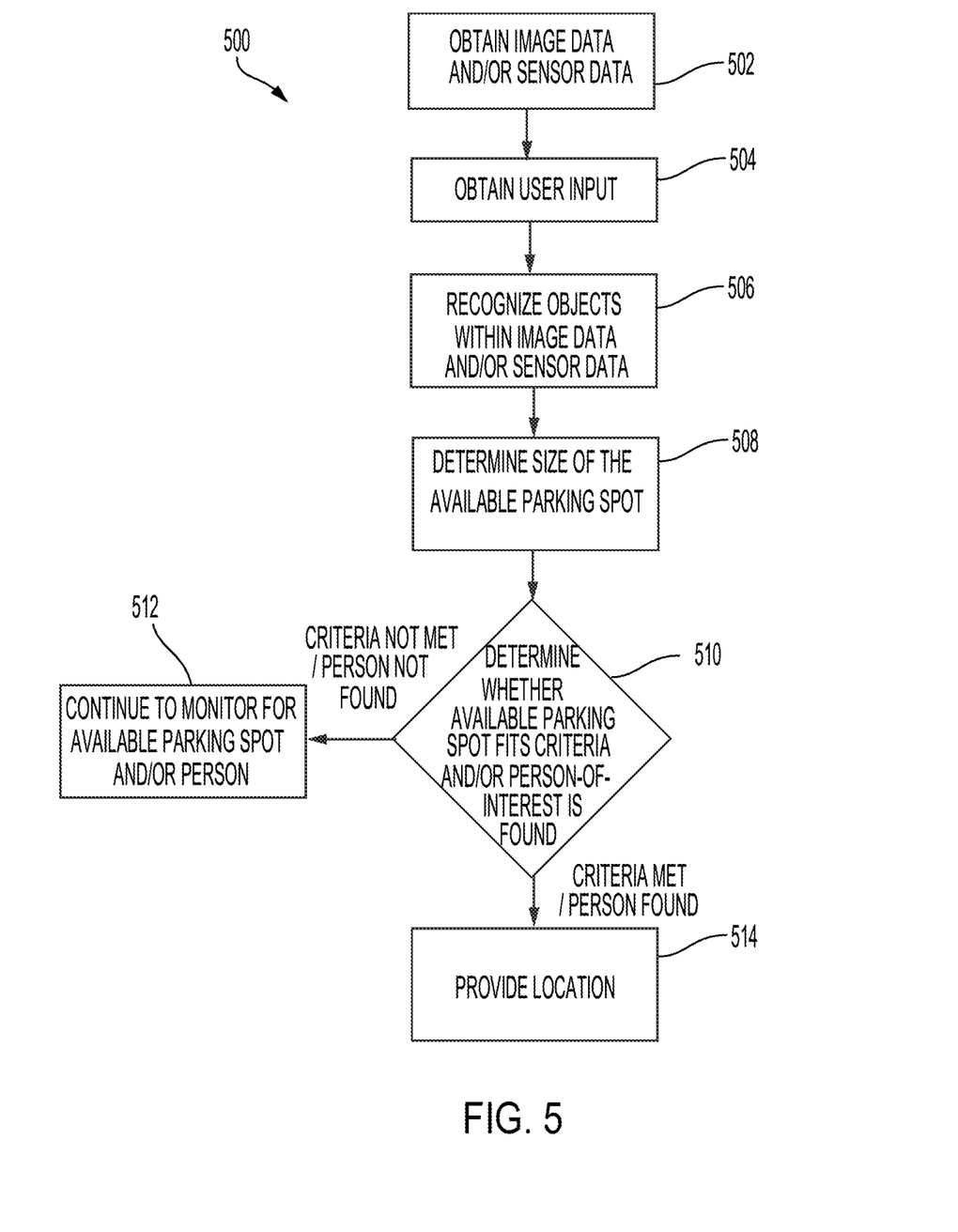
FIG. 5 is a flow diagram of an example process for determining whether the criteria are met and/or the person-of-interest is found using the detection system of FIG. 1 according to an aspect of the invention.

FIG. 5 is a flow diagram of an example process 500 for determining whether the criteria are met and/or the person-of-interest is found. One or more computers or one or more data processing apparatuses, for example, the ECU 110 of the detection platform 103 of the detection system 100 of FIG. 1, appropriately programmed, may implement the process 500. The detection platform 103 may have set the vehicle 102 into the spot detection mode (or the person detection mode) using the detailed setting prior to identifying or matching the person-of-interest and/or the user preferences with the features of the available spot.

The detection platform 103 may obtain and/or capture image data and/or sensor data, as described above (502). The detection platform 103 may use one or more cameras 116a that are positioned within or on the vehicle 102 to capture image data of the environment surrounding the vehicle 102. The image data may be a 2-D or 3-D image of the surrounding environment. The detection platform 103 may aggregate the image from two or more cameras 116a to form a composite image surrounding the environment. The detection platform 103 may obtain sensor data using one or more sensors, such as the proximity sensor 116c. The sensor data may include the presence or lack of presence of one or more objects in the surrounding environment. The detection platform 103 may use other sensors to capture other forms of sensor data, such as sound, light or radar, to determine the presence of one or more objects in the surrounding environment.

The detection platform 103 may obtain user input, as described above (504). The user input may include image data of the person-of-interest. The image data may have been captured using a camera within the vehicle 102 and/or a user device and transferred for storage into the memory 112. The image data of the person-of-interest may be used to compare with the captured image data from the one or more cameras 116a to determine whether there is a match.

The detection platform 103 may recognize objects within the captured image data and/or sensor data (506). The detection platform 103 may form a skeleton or outline around each object within the captured image data. The detection platform 103 may compare the skeleton or outline of each object within the captured image data with a database or a library of objects and their corresponding outlines. The database or the library objects may be stored within the memory 112 and/or within the external database 104. When there is a match between the outline of the object within the captured image data and the outline of a library object, the detection platform 103 may identify and associate the object within the captured image data with the library object.

Once the objects within the captured image data and/or detected sensor data are recognized, the detection platform 103 may determine the size of the available parking spot (508). The detection platform 103 may identify the different positions of the one or more objects from the image data and/or the sensor data and calculate the distance between the positions of the different objects to determine the size of any open areas that may be used as an available parking spot. The different positions may include the lateral positions of the different objects planar to the surface of the roadway to determine a width or a length of an open area and/or may include the vertical positions of the different objects perpendicular to the surface of the roadway to determine a height of the open area.

The detection platform 103 determines whether the available parking spot fits the criteria and/or the one or more person-of-interest is found (510). The detection platform 103 compares the size of the available parking spot with dimensions of the vehicle 102 along with a safety margin. The dimensions of the vehicle 102 may be pre-programmed, pre-configured and/or otherwise pre-determined. The safety margin may be indicated in the one or more user preferences. The detection platform 103 may determine that the available parking spot does not fit the criteria when the size is less than or equal to the dimensions of the vehicle 102 along with the safety margin regardless of the other criteria.

The one or more user preferences may indicate one or more objects to avoid, such as a fire hydrant or a no-load or parking zone, or one or more objects that are desired, such as business entity that is in close proximity. The detection platform 103 may compare the recognized objects to the one or more objects to avoid or that are desired as indicated in the one or more user preferences and determine whether there is a match. The detection platform 103 may determine that the available parking spot does not fit the criteria when the one or more objects in the image data match one or more objects to avoid and/or does not fit the criteria when the one or more objects in the image data do not match one or more objects that are desired. The detection platform 103 may determine that the available parking spot does fit the criteria when the one or more objects in the image data do not match one or more objects to avoid and/or does fit the criteria when the one or more objects in the image data do match one or more objects that are desired.

Similarly, the detection platform 103 compares the one or more recognized objects with the identity of the person-of-interest. The detection platform 103 may compare the one or more recognized objects with the image of the identity of the person-of-interest. The detection platform 103 may determine whether the objects match the identity of the person-of-interest based on the comparison. When the detection platform 103 determines that one or more objects do match the identity of the person-of-interest, the detection platform 103 may determine that the person-of-interest is found. And when the detection platform 103 determines that the one or more objects do not match the identity of the person-of-interest, the detection platform 103 may determine that the person-of-interest is not found.

When there is no match to the one or more objects that are desired, the person-of-interest is not found and/or there is a match to the one or more objects that are to be avoided, the detection platform 103 may notify that the user that the criteria is not met and continue to monitor for one or more available parking spots and/or persons (512). The detection platform 103 may notify the user via the user interface 120 and/or provide the notification to another device 108. The detection platform 103 may share the one or more objects recognized with other users by providing the list of the one or more objects that are recognized and their corresponding locations to the external database 104, which may be obtained by other user devices 108 and overlayed on a map.

When there is a match to the one or more objects that are desired, the person-of-interest is found and/or there is not a match to the one or more objects that are to be avoided, the detection platform 103 may notify that the user that the criteria is met and provide the location of one or more available parking spots and/or persons (514). The detection platform 103 may notify the user via the user interface 120 and/or provide the notification to another device 108. The detection platform 103 may share the one or more objects recognized with other users by providing the list of the one or more objects that are recognized and their corresponding locations to the external database 104, which may be obtained by other user devices 108 and overlayed on a map.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A detection system for a vehicle, comprising:
   at least one of a camera that is configured to capture image data of a surrounding environment or a sensor that is configured to detect sensor data;
   at least one of a navigation unit that is configured to determine or obtain a current location of the vehicle or a vehicle speed sensor that is configured to measure or determine a speed of the vehicle; and
   an electronic control unit coupled to the at least one of the camera or the sensor and coupled to the at least one of the navigation unit or the vehicle speed sensor, the electronic control unit configured to:
     activate the at least one of the camera or the sensor based on the current location of the vehicle or the speed of the vehicle;
     determine that there is an available parking spot or a person is positioned on a side of a road based on the image data or the sensor data, and
     provide a location of the available parking spot or the person to another device.

2. The detection system of claim 1,
   wherein the electronic control unit is configured to:
     determine the location of the available parking spot or the person based on the current location of the vehicle.

3. The detection system of claim 1, wherein the electronic control unit is configured to:
   detect whether there is an available parking spot when the speed of the vehicle is less than a first threshold amount;
   determine a size of the available parking spot when the speed of the vehicle is less than a second threshold amount; and
   identify one or more objects surrounding the available parking spot when the speed of the vehicle is less than the second threshold amount, wherein the second threshold amount is less than the first threshold amount.

4. The detection system of claim 1, wherein to provide the location of the available parking spot or the person to another device, the electronic control unit is configured to provide the location of the available parking spot to the other device to be displayed on a map.

5. The detection system of claim 1, wherein the electronic control unit is configured to:
   obtain an image of the person;
   recognize one or more objects within the image data;
   compare the image of the person to the one or more objects;
   determine that an object of the one or more objects matches the image of the person based on the comparison; and
   provide the location of the person.

6. A system for a vehicle, comprising:
   at least one of a camera that is configured to capture image data or a sensor configured to detect sensor data;
   a vehicle speed sensor configured to determine a speed of the vehicle; and
   an electronic control unit coupled to the at least one of the camera or the sensor and the vehicle speed sensor and configured to:
     activate a spot detection mode in a high-level setting when the speed of the vehicle is less than a first threshold speed or when resource usage of the sensor is less than a first threshold amount,
     activate the spot detection mode in a detailed setting when the speed of the vehicle is less than a second threshold speed, the second threshold speed being less than the first threshold speed,
     determine that there is an available parking spot or a person is positioned on a side of a road based on the image data or the sensor data when the vehicle is in the spot detection mode, and
     provide a location of the available parking spot or the person.

7. The system of claim 6, wherein the electronic control unit is configured to:
   activate the camera when the vehicle is in the spot detection mode; and
   operate the vehicle in a safety detection mode when the speed of the vehicle is greater than the first threshold amount.

8. The system of claim 6, further comprising:
   a navigation unit configured to determine a current location of the vehicle;
   wherein the electronic control unit is configured to:
     determine the location of the available parking spot or the person based on the current location of the vehicle.

9. The detection system of claim 6, wherein the electronic control unit is configured to:
   detect that there is the available parking spot when the speed of the vehicle is less than the first threshold speed; and
   determine a size of the available parking spot when the speed of the vehicle is less than the second threshold speed and the available parking spot is detected.

10. The detection system of claim 9, wherein the electronic control unit is configured to
    identify one or more objects surrounding the available parking spot when the speed of the vehicle is less than the second threshold speed.

11. The detection system of claim 6, wherein the vehicle is a semi-autonomous vehicle or a fully autonomous vehicle.

12. The detection system of claim 6, wherein to provide the location of the available parking spot or the person to another device the electronic control unit is configured to provide the location of the parking spot to the other device to be displayed on a map.

13. A method for identifying an available parking spot, comprising:
capturing, by a camera, image data;
detecting, by a sensor, sensor data;
determining, by a processor and using a speed sensor, a speed of a vehicle;
setting, by the processor, the vehicle into a spot detection mode in a high-level setting when the speed of the vehicle is less than a first threshold amount;
setting, by the processor, the vehicle into the spot detection mode in a detailed setting when the speed of the vehicle is less than a second threshold speed, the second threshold amount being less than the first threshold amount,
determining, by the processor, that there is an available parking spot or a person is positioned on a side of a road based on the image data or the sensor data when the vehicle is in the spot detection mode; and
providing, by the processor, a location of the available parking spot or the person to another device.

14. The method of claim 13, further comprising:
activating, by the processor, the camera when the vehicle is in the spot detection mode; and
operating, by the processor, the vehicle in a safety detection mode when the speed of the vehicle is greater than the first threshold amount to operate the vehicle in a safety detection mode.

15. The method of claim 13, further comprising:
determining a current location of the vehicle; and
determining the location of the available parking spot or the person based on the current location of the vehicle.

16. The method of claim 13, further comprising:
detecting that there is the available parking spot when the speed of the vehicle is less than the first threshold amount; and
determining a size of the available parking spot when the speed of the vehicle is less than the second threshold amount and the available parking spot is detected.

17. The method of claim 16, further comprising:
identifying one or more objects surrounding the available parking spot when the speed of the vehicle is less than the second threshold amount.

18. The method of claim 13, wherein the vehicle is a semi-autonomous vehicle or a fully autonomous vehicle.

19. The method of claim 13, wherein to provide the location of the available parking spot or the person to another device includes sharing the location of the parking spot to a plurality of other devices.

20. The detection system of claim 1, wherein the other device is associated with another vehicle so as to alert the other vehicle or a user associated with the other vehicle of the location of the available parking spot or the person.

* * * * *